(12) United States Patent
Kim

(10) Patent No.: US 10,009,772 B2
(45) Date of Patent: Jun. 26, 2018

(54) ELECTRONIC APPARATUS AND METHOD OF EXECUTING APPLICATION PROGRAM

(71) Applicant: Samsung Electronics Co., Ltd., Suwon-si, Gyeonggi-do (KR)

(72) Inventor: Joo-Hyun Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

(21) Appl. No.: 15/438,190

(22) Filed: Feb. 21, 2017

(65) Prior Publication Data

US 2017/0171756 A1    Jun. 15, 2017

Related U.S. Application Data

(63) Continuation of application No. 14/294,545, filed on Jun. 3, 2014, now Pat. No. 9,603,020.

(30) Foreign Application Priority Data

Dec. 30, 2013 (KR) .................. 10-2013-0167078

(51) Int. Cl.
| | |
|---|---|
| *G06F 7/04* | (2006.01) |
| *H04W 12/08* | (2009.01) |
| *G06F 21/44* | (2013.01) |
| *H04W 4/00* | (2018.01) |
| *G06F 9/4401* | (2018.01) |
| *G06F 13/10* | (2006.01) |
| *G06F 13/20* | (2006.01) |
| *G06F 13/42* | (2006.01) |

(52) U.S. Cl.
CPC .......... *H04W 12/08* (2013.01); *G06F 9/4415* (2013.01); *G06F 13/102* (2013.01); *G06F 13/20* (2013.01); *G06F 13/4282* (2013.01); *G06F 21/44* (2013.01); *H04W 4/001* (2013.01); *G06F 2213/0042* (2013.01)

(58) Field of Classification Search
CPC ... G10L 15/22; G10L 2015/223; G10L 15/30; G10L 21/0208; G08C 17/02; G08C 2201/30; G06F 13/102; G06F 13/20; G06F 13/4282; G06F 21/44; G06F 2213/0042; G06F 9/4415; H04W 12/08; H04W 4/001
See application file for complete search history.

(56) References Cited

U.S. PATENT DOCUMENTS

| | | | |
|---|---|---|---|
| 6,853,293 B2 * | 2/2005 | Swartz | ............... G06F 1/163 |
| | | | 235/462.15 |
| 2008/0077564 A1 | 3/2008 | Hattori | |

(Continued)

FOREIGN PATENT DOCUMENTS

| | | |
|---|---|---|
| KR | 10-2005-0040549 A | 5/2005 |
| KR | 10-2012-0054710 A | 5/2012 |

*Primary Examiner* — Abiy Getachew
(74) *Attorney, Agent, or Firm* — Jefferson IP Law, LLP

(57) ABSTRACT

A method of executing an application program in an electronic apparatus is provided. The method includes storing device support information corresponding to at least one application program, receiving device information from an external device, searching for one or more application programs supporting the external device based on the device information and the device support information, and executing an application program among the found one or more application programs.

20 Claims, 6 Drawing Sheets

(56) References Cited

U.S. PATENT DOCUMENTS

| | | | |
|---|---|---|---|
| 2008/0250172 A1* | 10/2008 | Tanaka | G06F 3/0605 710/63 |
| 2009/0128513 A1* | 5/2009 | Han | G06F 3/0416 345/174 |
| 2009/0268754 A1 | 10/2009 | Palm et al. | |
| 2011/0066721 A1 | 3/2011 | Shinomiya | |
| 2011/0179149 A1 | 7/2011 | Kazan et al. | |
| 2012/0131228 A1 | 5/2012 | Kim et al. | |
| 2014/0115202 A1 | 4/2014 | Yoshinaga | |

* cited by examiner

```xml
<?xml version="1.0" encoding="UTF-8" standalone="no"?>
<Manifest xmlns="http://schemas.tizen.org/2012/12/manifest">
    <Id>8rsNfWtnlE</Id>
    <Version>1.0.0</Version>
    <Type>C++App</Type>
    <Requirements>
        <Feature Name="http://tizen.org/feature/platform.core.cpu.arch.armv7">true</Feature>
        <Feature Name="http://tizen.org/feature/platform.core.fpu.arch.vfpv3">true</Feature>
    <Requirements>
    <Apps>
        <ApiVersion>2.1</ApiVersion>
        <Privileges>
            <Privilege>http://tizen.org/privilege/application.launch</Privilege>
        </Privileges>
        <UiApp LaunchingHistoryVisible="True" Main="True" MenuIconVisible="True" Name="SystemApp">
            <UiTheme SystemTheme="whithe"/>
            <DisplayNames>
                <DisplayName Locale="eng-GB">SystemApp</DisplayName>
            </DisplayNames>
            <Icons>
                <Icon Section="<MainMenu" Type="Xhigh">mainmenu.png</Icon>
            </Icons>
            <LaunchConditions>
                <Condition Name="usb-device">          ~617
                    <Class>EFh</Class>                  ~603
                    <Subclass>02h</Subclass>            ~605
                    <Protocol>02h</Protocol>            ~607
                    <Id>01</Id>                         ~609
                    <Name>Appcessory</Name>             ~611
                    <ProductId>01</ProductId>           ~613
                    <VendorId>01</VendorId>             ~615
                </Condition>
                :
            </LaunchConditions>
        </UiApp>
    </Apps>
</Mainfest>
```

FIG.6

ELECTRONIC APPARATUS AND METHOD OF EXECUTING APPLICATION PROGRAM

CROSS-REFERENCE TO RELATED APPLICATION(S)

This application is a continuation application of prior U.S. application Ser. No. 14/294,545, filed on Jun. 3, 2014 which claims the benefit under 35 U.S.C. § 119(a) of a Korean patent application filed on Dec. 30, 2013 in the Korean Intellectual Property Office and assigned Serial No. 10-2013-0167078, the entire disclosure of which is hereby incorporated by reference.

TECHNICAL FIELD

The present disclosure relates to an electronic apparatus and a method of executing an application program.

BACKGROUND

An electronic apparatus, such as a smart phone and a tablet Personal Computer (PC), has provided a user with various useful functions through various applications. The electronic apparatus has evolved into a device capable of using various types of information together with a voice call function through the provision of various functions. When the electronic apparatus is connected with an external device, a function, which the electronic apparatus cannot provide, is provided.

A driver for an external device may be installed in the electronic apparatus in advance, and a connection system between the external device and the electronic apparatus is established by using the installed driver. Further, when the electronic apparatus is connected with the external device, the electronic apparatus executes an application program supporting the external device. In this case, the application program receives a confirmation for an external device, which the application program desires to control, from a user, or automatically searches an external device to confirm the external device, which the application program desires to control. In order to automatically search for an external device, the application program requires a driver, so the application program obtains driver access authority from an operating system of the electronic apparatus in order to access the driver.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an application program to automatically search for an external device, the application program needs to obtain driver access authority for an external device. In order for the application program to obtain the driver access authority, the application program makes a request for the driver access authority to the external device through a kernel of the operating system (for example, Android), and receives a response to the request from the external device through the kernel, so that there is a problem in that a complex operation needs to be performed in order to search for the external device. Further, when another application program desires to use the same external device while the application program uses the external device, there is a problem in that the application program using the external device cannot continuously provide a function currently provided to a user due to another application program.

Another aspect of the present disclosure is to provide an electronic apparatus and a method of executing an application program so as to automatically search for an application program related to an external device.

Another aspect of the present disclosure is to provide an electronic apparatus and a method of executing an application program so as to allow any one application program among a plurality of application programs to use an external device.

In accordance with an aspect of the present disclosure, an electronic apparatus for executing an application program is provided. The electronic apparatus includes a memory unit configured to store device support information corresponding to at least one application program, and a controller configured to receive device information from an external device when the external device is connected with the electronic apparatus, to search for one or more application programs supporting the external device based on the device information and the device support information, and to execute an application program among the found one or more application programs.

In accordance with another aspect of the present disclosure, a method of executing an application program in an electronic apparatus is provided. The method includes storing device support information corresponding to at least one application program, receiving device information from an external device, searching for one or more application programs supporting the external device based on the device information and the device support information, and executing an application program among the found one or more application programs.

In accordance with another aspect of the present disclosure, the electronic device is provided. The electronic device includes an application program based on device support information, thereby achieving an effect of automatically searching for an application program related to an external device.

In accordance with another aspect of the present disclosure, the electronic device is provided. The electronic device includes an application program by using exclusive use authority, thereby achieving an effect that any one application program among a plurality of application programs uses an external device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 is a diagram illustrating a computer language of package meta data according to an embodiment of the present disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic apparatus according to various embodiments of the present disclosure may include a video phone, a mobile phone, a smart phone, an International Mobile Telecommunication (IMT)-2000 terminal, a Wideband Code Division Multiple Access (WCDMA) terminal, a Universal Mobile Telecommunication Service (UMTS) terminal, a Personal Digital Assistant (PDA), a Portable Multimedia Player (PMP), a Digital Multimedia Broadcasting (DMB) terminal, an E-Book, a portable computer (for example, a notebook computer or a tablet computer), or a digital camera.

Figure 1:
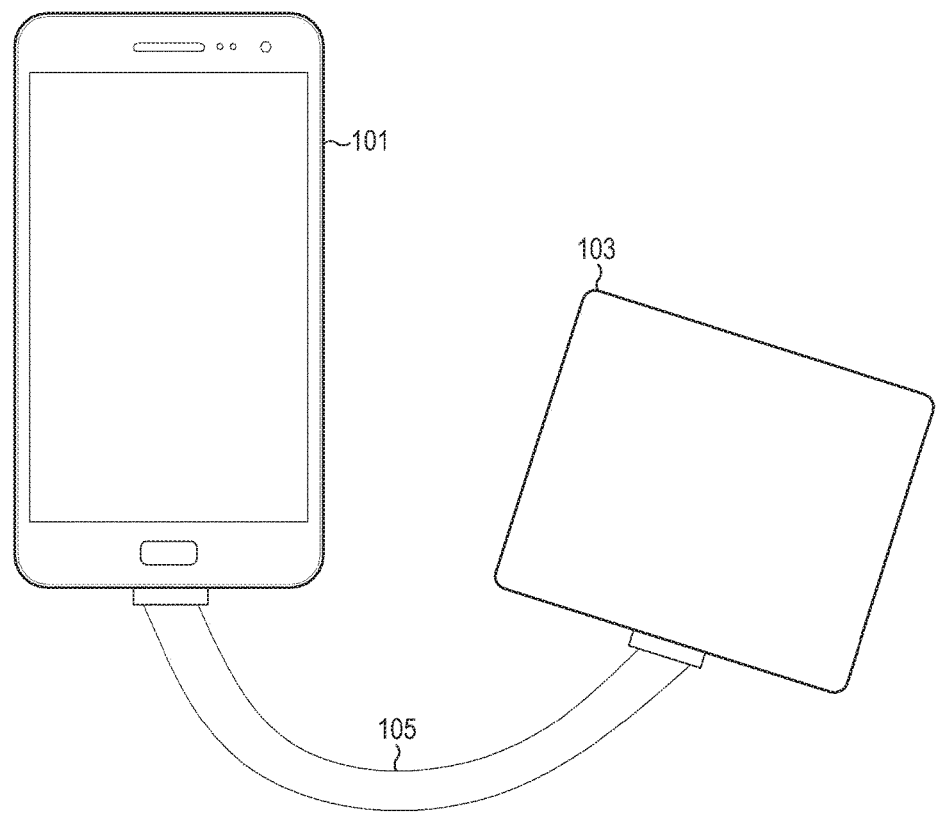
FIG. 1 is a diagram of a communication system according to an embodiment of the present disclosure.

FIG. 1 is a diagram of a communication system according to an embodiment of the present disclosure.

Referring to FIG. 1, a communication system may include an electronic apparatus 101, an external device 103, and a cable 105 for connecting the electronic apparatus 101 and the external device 103.

The cable 105 may connect the electronic apparatus 101 and the external device 103, and may transmit a data signal generated by a specific communication scheme supported by the electronic apparatus 101 and the external device 103 from the electronic apparatus 101 to the external device 103 or from the external device 103 to the electronic apparatus 101. For example, the specific communication scheme may be a Universal Serial Bus (USB) communication scheme. The USB communication scheme has been gradually developed from the USB 1.0 communication scheme to the USB 3.0 communication scheme.

The external device 103 may be connected with the electronic apparatus 101 through the cable 105, and may transmit a data signal stored in the external device 103 to the electronic apparatus 101, or receive a data signal from the electronic apparatus 101. For example, the external device 103 may have a form of an accessory, and may include a television, a monitor, a beam projector, a keyboard, a touch screen, a keyboard, a personal computer, an audio player, an auxiliary battery, a joystick, or any other suitable and/or similar device.

The electronic apparatus 101 may be connected with the external device 103 through the cable 105, and may execute an application program according to the type of the external device 103, and control the external device 103 by using the executed application program.

Figure 2:
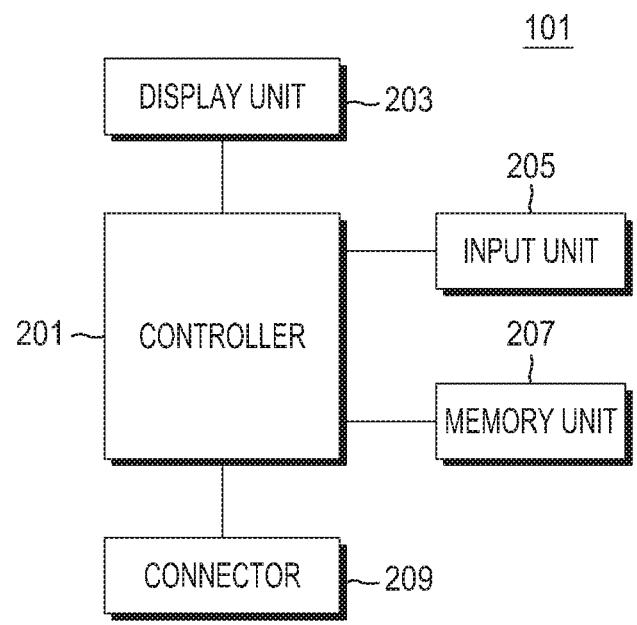
FIG. 2 is a block diagram illustrating an electronic apparatus according to an embodiment of the present disclosure.

FIG. 2 is a block diagram illustrating the electronic apparatus according to an embodiment of the present disclosure.

Referring to FIGS. 1 and 2, the electronic apparatus 101 may include a controller 201, a display unit 203, an input unit 205, a memory unit 207, and a connector 209.

The input unit 205 may include keys for inputting number and character information and function keys for setting various functions.

The display unit 203 may display an image signal on a screen, and display data requested to be output from the controller 201.

Further, when the display unit 203 is implemented in a capacitive touch display screen type or a resistive touch display screen type, the input unit 205 may include only the predetermined minimum number of keys, and thus, the display unit 203 may partially replace key input functions of the input unit 205.

The memory unit 207 may include a program memory and a data memory. The program memory may store at least one of a booting and Operating System (hereinafter, referred to as an "OS"), and a platform for controlling a general operation of the electronic apparatus 101. The data memory may store various data generated during an operation of the electronic apparatus 101.

Further, the memory unit 207 may store, for example, external device support information corresponding to a specific application. Here, the external device support information is information indicating the type of external devices supported by the specific application program, and may include at least one of an IDentification (ID), a condition name, a class, a subclass, a protocol, a name, a product ID, a vendor ID, and any other similar and/or suitable information. For example, the external device may be a USB device, or any other suitable and/or similar device.

The external device support information may be stored in a form of a table, such as Table 1.

TABLE 1

| ID | Conditoin Name | Class | Sub-class | Protocol | Name | Product ID | Vendor ID |
|---|---|---|---|---|---|---|---|
| 01 | usb-device | EFh | 02h | 02h | Appcessory | 01 | 01 |
| ... | ... | ... | ... | ... | ... | ... | ... |

The ID may indicate an ID assigned so as to confirm the number of specific devices by which the specific application program is automatically executed.

The condition name may indicate a condition of the specific external device for the automatic execution of the specific application program. For example, when the automatic execution condition of the specific application program is that the specific external device is a USB device, the condition name may be "usb-device" indicating that the specific device is a USB device.

The class may indicate the type of specific devices. For example, when the specific device is an input device, the class may be "EFh" indicating that the specific device is an input device.

The subclass indicates a subclass of the specific device. For example, the subclass may include an indicator indicating the type of specific device. For example, when the specific device is a joystick, the subclass may be "02h" indicating that the specific device is a joystick.

The protocol may indicate a protocol supported by the specific device. For example, the protocol may be "02h".

The name indicates a name of the specific device. The name may be, for example, "Appcessory".

A product ID may indicate a product ID assigned to the specific device. For example, the product ID may be "01".

The vender ID may indicate an ID of a manufacturing company which manufactures the specific device. For example, the vender ID may be "01".

That is, the memory unit 207 may store at least one element among the elements of information included in the external device support information for each application program, and may store at least one element in the form of the table like Table 1.

The connector 209 may connect the electronic apparatus 101 and the external device 103 through the cable 105. Here, the connector 209 may be, for example, a connector for USB communication or a connector supporting both USB communication and another type of communication (for example, Mobile High-Definition Link (MHL) communication).

The controller 201 may control a general operation of the electronic apparatus 101. For example, the controller 201 may execute a platform stored in the memory unit 207. When the specific application program is installed in the electronic apparatus 101, the controller 201 may store the external device support information corresponding to the specific application program in the memory unit 207 by using the platform. Further, when the electronic apparatus 101 is connected with the external device, the controller 201 may confirm an application program supporting the external device by using the platform, and automatically execute the confirmed application program.

Figure 3:
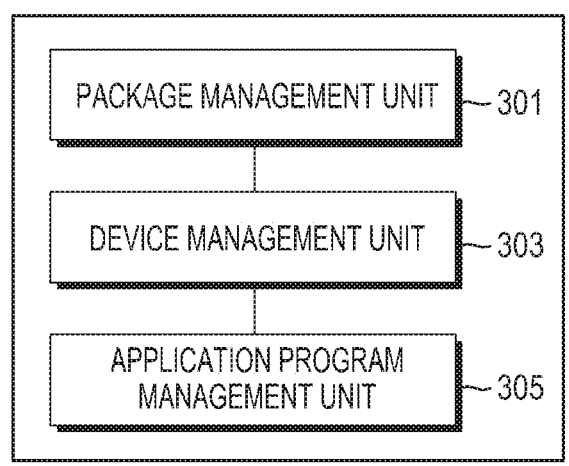
FIG. 3 is a block diagram of a platform according to embodiment of the present disclosure.
Figure 7:
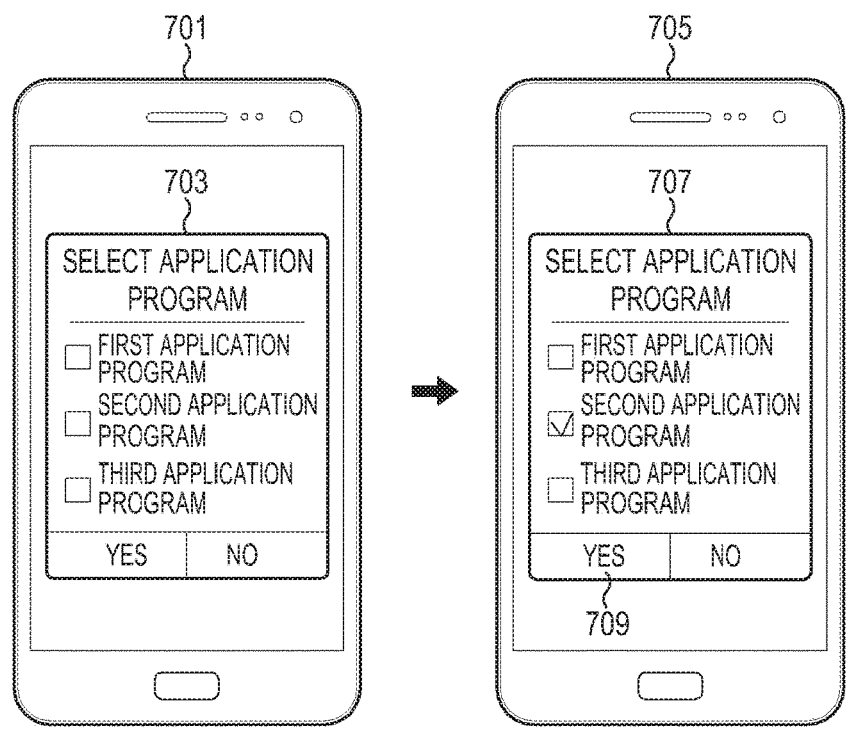
FIG. 7 is a diagram illustrating a screen on which an application program is executed according to an embodiment of the present disclosure.

FIG. 3 is a block diagram of a platform according to an embodiment of the present disclosure. FIG. 6 is a diagram illustrating a computer language of package meta data according to an embodiment of the present disclosure. FIG. 7 is a diagram illustrating a screen on which an application program is executed according to an embodiment of the present disclosure.

Referring to FIGS. 1, 2, 3 and 6, the platform may include a package management unit 301, a device management unit 303, and an application program management unit 305.

When the external device is connected with the electronic apparatus 101, the device management unit 303 may transmit external device information related to the external device to the package management unit 301.

For example, the device management unit 303 may confirm whether the external device is connected through the connector 209. When the external device is connected, the device management unit 303 may receive external device information from the connected external device, and transmit the received external device information to the package management unit 301.

The external device information is information related to the connected external device, and may include at least one of a class, a subclass, a protocol, a name, a product ID, a vender ID of the external device, and any other similar and/or suitable information. The class indicates a class of the connected external device, the subclass indicates a subclass of the connected external device, and the protocol indicates a protocol supporting the connected external device. The name indicates a name of the connected external device, the product ID indicates a product ID of the connected external device, and the vender ID is an ID of a manufacturing company which manufactures the external device.

The package management unit 301 may configure external device support information for each application program into a database. The package management unit 301 may confirm whether a specific application program is installed in the electronic apparatus 101. The specific application program may be received from an external server or another electronic apparatus wirelessly or wiredly. For example, when the specific application program is installed, the package management unit 301 may detect package meta data from package data of the specific application program, and detect the external device support information from the detected meta data. The package meta data may be attribute information, and may include at least one of contents of information about the package data, user information, a right condition, a use condition, use history information, and the external device support information. For example, the package meta data may be a "Manifest.xml" file of the specific application program. In another example, when the package meta data is the "Manifest.xml" file of a specific application program as shown in FIG. 6, the package management unit 301 may detect external device support information 601 included in the package meta data. The external device support information 601 is information indicating the type of external device supported by the specific application program, and may include one or more of an ID 609, a condition name 617, a class 603, a subclass 605, a protocol 607, a name 611, a product ID 613, and a vender ID 615, and store each constituent element of the external device support information in a form of a table like Table 1 or another similar and/or suitable form.

Further, the package management unit 301 may store, for example, the external device support information so as to correspond to the specific application program in the memory unit 207. For example, when the package meta data is "Manifest.xml" as in FIG. 6, the package management unit 301 may configure the external device support information into a table like Table 1 or another similar and/or suitable form, and store the external device support information.

For example, the package management unit 301 may generate the external device support information corresponding to the application program for each application program. When the package management unit 301 is connected with the external device, the package management unit 301 may generate an application program list including an application program identifier supporting the connected external device, and transmit the generated application program list to the application program management unit 305.

That is, when the package management unit 301 is connected with the external device, the package management unit 301 may receive the external device information about the connected external device from the device management unit 303. The package management unit 301 may search for one or more application programs supporting the external device based on the external device information and the pre-stored external device support information for each application program. The package management unit 301 may generate an application program list including one or more application program identifiers indicating the found one or more application programs, and transmit the generated application program list to the application program management unit 305. Here, the application program identifier may be an application program name.

For example, the package management unit 301 may search for one or more elements of the external device support information including one or more elements among all of the elements included in the external device information in the external device support information for each application program. When the package management unit 301 searches for one or more elements of the external device support information including the one or more elements, the package management unit 301 may generate an application program list including one or more application program names corresponding to the found external device support information.

For example, the package management unit 301 may search for one or more elements of the external device support information including all of the elements included in the external device information in the external device support information for each application program. When the one or more elements of external device support information including all of the elements is found, the package management unit 301 may generate an application program list including one or more application program names corresponding to the found external device support information.

The application program management unit 305 may execute an application program supporting an external device. For example, the application program management unit 305 may receive the application program list from the package management unit 301, and may confirm whether the number of found application programs is plural by analyzing the received application program list. For example, when the number of found application programs is one, the application program management unit 305 may automatically execute a specific application program corresponding to a specific application program identifier included in the application program list. In another example, when the number of found application programs is plural, the application program management unit 305 may display a plurality of application program identifiers included in the application program list. For example, the application program management unit 305 may display a pop-up window 703 including application program names and check boxes for receiving a selection of any one application program name among the application program names as in screen 701 in FIG. 7.

For example, the application program management unit 305 may confirm whether any one application program identifier is selected among the plurality of displayed application programs by a user. For example, when a check box corresponding to a second application program is selected by a user among the check boxes included in the pop-up window 707 as in screen 705 of FIG. 7, and "YES" 709 is selected by the user, the application program management unit 305 may determine that the second application program is selected.

Further, for example, when a specific application program identifier is selected, the application program management unit 305 may assign exclusive use authority for an external unit device connected to a specific application program corresponding to the selected application program identifier. Accordingly, an external device connected with another non-selected application program cannot be used. That is, the application program management unit 305 may execute the specific application program corresponding to the selected application program identifier. For example, when the second application program is selected as in screen 705 of FIG. 7, the application program management unit 305 may assign exclusive use authority for a USB device connected to the second application program, and execute the second application program.

Figure 4:
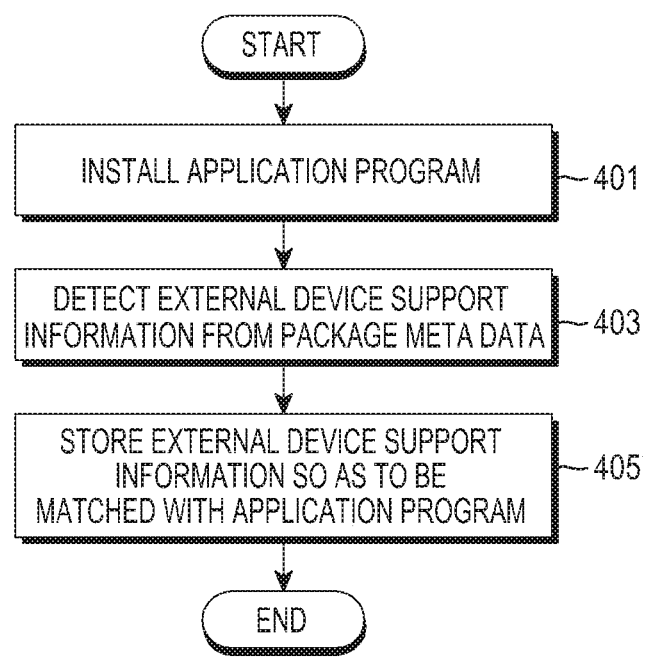
FIG. 4 is a flowchart illustrating a process of configuring external device support information into a database according to an embodiment of the present disclosure.

FIG. 4 is a flowchart illustrating a process of configuring USB support information into a database according to an embodiment of the present disclosure.

Referring to FIGS. 1, 3, 4, and 6, in operation 401, the package management unit 301 may install a specific application program in the electronic apparatus 101. In this case, the specific application program may be received from an external server or another electronic apparatus wirelessly or wiredly.

In operation 403, the package management unit 301 may detect package meta data from package data of the specific application program, and detect external device support information from the detected package meta data. For example, the package metal data may be a "Manifest.xml" file of the specific application program. In another example, when the package meta data is the "Manifest.xml" file of the specific application program as in FIG. 6, the package management unit 301 may detect external device support information 601 included in the package meta data. The external device support information 601 is information indicating the type of external device supported by the specific application program, and may include the ID 609, the condition name 617, the class 603, the subclass 605, the protocol 607, the name 611, the product ID 613, and the vender ID 615.

In operation 405, the package management unit 301 may store the external device support information so as to correspond to the specific application program. For example, when the package meta data is "Manifest.xml" like FIG. 6, the package management unit 301 may configure the external device support information into a table like Table 1 or another similar and/or suitable form, and store the external device support information.

Hereinafter, various embodiments of the present disclosure assume that the package management unit 301 configures the external device support information into a database.

Figure 5:
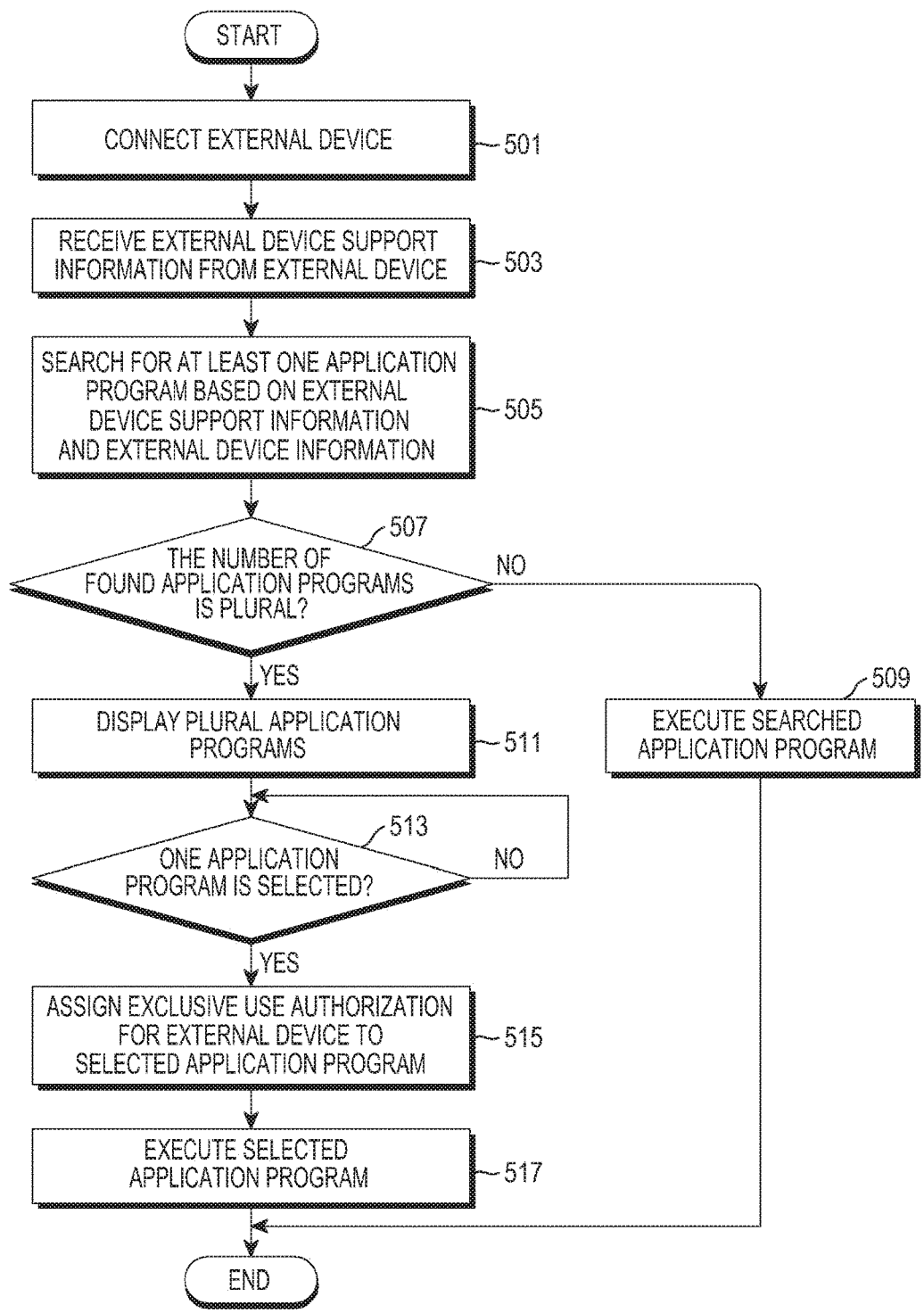
FIG. 5 is a flowchart illustrating an execution of an application program according to an embodiment of the present disclosure.

FIG. 5 is a flowchart illustrating an execution of an application program according to an embodiment of the present disclosure.

Referring to FIGS. 3, 5, and 7, in operation 501, the device management unit 303 is connected with an external device through the connector 209.

In operation 503, the device management unit 303 may receive external device information from the connected external device. Here, the external device information is information related to the connected external device, and may include a class, a subclass, a protocol, a name, a product ID, a vender ID of the external device, and any another similar and/or suitable information. The class indicates a class of the connected external device, the subclass indicates a subclass of the connected external device, and the protocol indicates a protocol supporting the connected external device. The name indicates a name of the connected external device, the product ID indicates a product ID of the connected external device, and the vender ID is an ID of a manufacturing company which manufactures the external device.

In operation 505, the package management unit 301 receives the external device information from the device management unit 303, and searches for one or more application programs which support the external device based on the external device information and the pre-stored external device support information for each application program. Accordingly, the package management unit 301 may generate an application program list including one or more application program identifiers indicating the found one or more application programs. Here, the application program identifier may be an application program name. Further, for example, the package management unit 301 may search for one or more elements of the external device information received from the external device in the external device support information for each application program. When the external device support information including the one or more elements of the external device information is found, the package management unit 301 may generate one or more application program lists corresponding to the found external device support information. The application program list may include a name of the connected external device.

In another example, the package management unit 301 may store a plurality of elements of external device support information including all of the elements of the external device information received from the external device. The package management unit 301 may search for one or more elements of external device support information including all of the elements included in the external device information in the external device support information corresponding to the application program. When the one or more elements of external device support information including all of the elements is found, the package management unit 301 may generate one or more application program lists corresponding to the found external device support information. The application program list may include a name of the connected external device.

Further, in operation 507, the application program management unit 305 may receive the application program list from the package management unit 301, and may confirm whether the number of found application programs is plural by analyzing the received application program list.

When the number of found application programs is plural, the application program management unit 305 may perform operation 511, otherwise, the application program management unit 305 may perform operation 509.

In operation 509, the application program management unit 305 may automatically execute a specific application program corresponding to a specific application program identifier included in the application program list.

In operation 511, the application program management unit 305 may display a plurality of application program identifiers included in the application program list, and then perform operation 513. For example, the application program management unit 305 may display the pop-up window 703 including application program names and check boxes, through which any one application program name is selectable among the application program names, as in screen 701 in FIG. 7.

Further, in operation 513, the application program management unit 305 may confirm whether any one application program identifier is selected among the plurality of displayed application programs by a user. For example, when a check box corresponding to a second application program is checked among the check boxes included in the pop-up window 707 as in screen 705 of FIG. 7, and "YES" 709 is checked, the application program management unit 305 may determine that the second application program is selected.

Further, in another example, the program management unit 305 may automatically select one among the plurality of application programs according to a predetermined priority. For example, when the found application program is the first application program and the second application program, the program management unit 305 may automatically select the first application program according to a predetermined priority (in a case where the first application program has a higher priority than the second application program). Accordingly, the program management unit 305 may receive exclusive use authority for the first application program, and execute the first application program. When the specific application program identifier is selected, the program management unit 305 may perform operation 515, otherwise, the program management unit 305 may repeatedly perform operation 513.

In operation 515, the program management unit 305 may assign exclusive use authority for the external device connected to the specific application program corresponding to the application program identifier selected so that non-selected other application programs do not use the external device, and then perform operation 517.

In operation 517, the application program management unit 305 may execute the specific application program corresponding to the selected application program identifier. For example, when the second application program is selected as in screen 705 of FIG. 7, the application program management unit 305 may assign exclusive use authority for the external device connected to the second application program, and execute the second application program.

Referring back to FIG. 6, the package meta data for a specific application program may include the external device support information 601. Here, the external device support information 601 is information indicating the type of external device supported by the specific application program, and may include at least one of the ID 609, the condition name 617, the class 603, the subclass 605, the protocol 607, the name 611, the product ID 613, and the vender ID 615.

Here, the ID 609 indicates an ID assigned in order to confirm the number of specific devices by which the specific application program is automatically executed. Further, the condition name 617 indicates the condition of the specific device for the automatic execution of the specific application program. For example, when the condition of the automatic execution of the specific application program is that the specific device is the external device, the condition name may be "usb-device" indicating that the specific device is the external device. Further, the class 603 indicates the type of specific device. For example, when the specific device is an input device, the class may be "EFh" indicating that the specific device is the input device.

Further, the subclass 605 indicates a subclass of the specific device. For example, when the specific device is a joystick which is one of the types of input device, the subclass may be "02h" indicating that the specific device is a joystick. Further, the protocol 607 indicates a protocol supported by the specific device, and the name 611 indicates a name of the specific device. Further, the product ID 613 indicates a product ID assigned to the specific device, and the vender ID 615 indicates an ID of a manufacturing company which manufactures the specific device.

When the specific application program supports an external device of another class or another subclass, the package meta data may include external device support information about another class or external device support information about another sub class in addition to the external device support information 601.

Referring back to FIG. 7, when the application program list includes the plurality of application program identifiers, the application program management unit 305 may display the pop-up window 703 including the application program identifiers and the check boxes through which any one application program identifier may be selected among the application program identifiers as in screen 701 of FIG. 7.

Further, when a check box corresponding to the second application program is checked among the check boxes included in the pop-up window 707 as in screen 705 of FIG. 7, and "YES" 709 is checked, the application program management unit 305 may determine that the second application program is selected.

Further, the application program management unit 305 may assign the exclusive use authority for the external device connected to the second application program, and executes the second application program, thereby preventing another application program from using the external device.

According to the various embodiments of the present disclosure, the electronic apparatus executes an application program based on device support information, thereby achieving an effect of automatically searching for an application program related to an external device. Further, according to the various embodiments of the present disclosure, the electronic apparatus executes an application program by using exclusive use authority, thereby achieving an effect that any one application program among a plurality of application programs uses an external device.

The apparatus and the method of setting the gesture in the electronic device according to the various embodiments of the present disclosure may be implemented by computer readable codes in a non-transitory computer readable recording medium. The non-transitory computer-readable recording medium includes all the types of recording devices in which data readable by a computer system are stored. As for such a recording medium, for example, a Read Only Memory (ROM), a Random Access Memory (RAM), an optical disc, a magnetic tape, a floppy disc, a hard disc, or a non-volatile memory may be used. In addition, the non-transitory computer-readable recording medium may be stored with codes which are distributed in computer systems connected by a network such that the codes can be read and executed by a computer in a distributed method.

In the descriptions of the various embodiments of the present disclosure, the particular embodiments, like the electronic device, have been described, but various modifications may be carried out without departing from the scope of the present disclosure. Therefore, it is apparent that the claims of the present disclosure should be defined by the equivalents of the claims as well as the claims instead of the embodiments. For example, the embodiments of the present disclosure have been described based on an external device, but the embodiments of the present disclosure may be applied to other communication methods.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A portable communication device comprising:
    a touch screen;
    an interface to support a communication connection between the portable communication device and an external device; and
    a processor adapted to:
        establish, via the interface, the communication connection, based at least in part on detecting that the portable communication device is electrically connected with the external device;
        based at least in part on a first determination that the external device corresponds to a first external device, automatically perform a specific function corresponding to the first external device, using the communication connection; and
        based at least in part on a second determination that the external device corresponds to a second external device, display, via the touch screen, a first indication indicative of a first application, and a second indication indicative of a second application, the first and second applications to control the communication connection.

2. The portable communication device of claim 1, wherein the processor is adapted to display, via the touch screen, a third indication with respect to the specific function, as at least part of the performing.

3. The portable communication device of claim 1, wherein the processor is adapted to initiate the performing, without a user input in relation with the communication connection.

4. The portable communication device of claim 1, wherein the processor is adapted to:
    receive, via the touch screen, a user input after the displaying of the first and second indications;
    activate the second application based at least in part on a determination that the user input corresponds to the second indication; and
    refrain from activating of the second application based at least in part on a determination that the user input not corresponds to the second indication.

5. The portable communication device of claim 1, wherein the processor is adapted to:
    display a third indication related to the communication connection, based at least in part on the second determination;
    receive a user input with respect to the third indication;
    authorize one of the first application and the second application to access the communication connection based at least in part on the user input; and
    perform the establishing using the authorized one of the first application and the second application.

6. The portable communication device of claim 1, further comprising memory to store information related to priorities of the first and second applications,
    wherein the processor is adapted to:
        select at least one application of the first and second applications based at least in part on the information; and
        activate the at least one application in relation with the communication connection, prior to the displaying.

7. The portable communication device of claim 1, wherein the processor is adapted to execute a third application corresponding to the first external device, as at least part of the performing.

8. The portable communication device of claim 1, wherein the processor is adapted to:
- obtain, via the interface, information related to the external device, prior to the establishing; and
- identify the external device as the first external device or the second external device, based at least in part on the information.

9. The portable communication device of claim 8, wherein the information comprises a type, an identification (ID), a condition name, a class, a subclass, a protocol, a name, a product ID, or a vendor ID of the external device, or any combination thereof.

10. The portable communication device of claim 1, wherein the first external device comprises an auxiliary battery, a charger, or an accessory, and the second external device comprises a desktop computer, or a portable computer.

11. The portable communication device of claim 1, wherein the communication connection comprises a universal serial bus (USB) connection, a mobile high definition link (MHL) connection, a wired communication connection, or any combination thereof.

12. A portable communication device comprising:
- an interface to support a universal serial bus (USB) communication between the portable communication device and an external device;
- memory to store first and second applications to control the USB communication; and
- a processor adapted to:
  - detect that the portable communication device is electrically connected with the external device via the interface;
  - authorize at least one application of the first and second applications to access the USB communication, in response to the detecting; and
  - automatically establish the USB communication using the at least one application.

13. The portable communication device of claim 12, wherein the processor is adapted to perform the authorizing based at least in part on a user input with respect to the portable communication device.

14. The portable communication device of claim 12,
- wherein the memory is adapted to store information related to priorities of the first and second applications, and
- wherein the processor is adapted to select the at least one application based at least in part on the information.

15. The portable communication device of claim 12, further comprising a touch screen,
- wherein the processor is adapted to:
  - display, via the touch screen, a first indication indicative of the first application, and a second indication indicative of the second application;
  - receive, via the touch screen, a user input with respect to the first indication or the second indication; and
  - activate a corresponding one of the first application and the second application, in relation with the USB connection, based at least in part on the user input.

16. The portable communication device of claim 12, wherein the processor is adapted to:
- obtain, via the interface, information related to the external device, prior to the authorizing; and
- identify the external device, based at least in part on the information.

17. The portable communication device of claim 16, wherein the information comprises a type, an identification (ID), a condition name, a class, a subclass, a protocol, a name, a product ID, or a vendor ID of the external device, or any combination thereof.

18. The portable communication device of claim 12, wherein the external device comprises an auxiliary battery, a charger, an accessory, a desktop computer, a portable computer, or any combination thereof.

19. A non-transitory machine-readable storage device storing instructions that, when executed by one or more processors, cause one or more processors to perform operations comprising:
- detecting, at an portable communication device including an interface to support a universal serial bus (USB) communication between the portable communication device and an external device, that the portable communication device is electrically connected with the external device via the interface;
- authorizing, at the portable communication device including memory to store first and second applications, at least one application of the first and second applications to access the USB communication, in response to the detecting; and
- automatically establish the USB communication using the at least one application.

20. The non-transitory machine-readable storage device of claim 19,
- wherein the memory is adapted to store information related to priorities of the first and second applications, and
- wherein the authorizing comprises selecting, at the portable communication device, the at least one application based at least in part on the information.

* * * * *